United States Patent
Takaishi et al.

(10) Patent No.: US 7,948,698 B2
(45) Date of Patent: May 24, 2011

(54) PATTERN TRANSFER APPARATUS AND PATTERN TRANSFER METHOD

(75) Inventors: Kazuhiko Takaishi, Kawasaki (JP); Masanori Fukushi, Kawasaki (JP)

(73) Assignee: Toshiba Storage Device Corporation, Tokyo (JP)

( * ) Notice: Subject to any disclaimer, the term of this patent is extended or adjusted under 35 U.S.C. 154(b) by 275 days.

(21) Appl. No.: 12/398,595

(22) Filed: Mar. 5, 2009

(65) Prior Publication Data

US 2009/0285073 A1    Nov. 19, 2009

(30) Foreign Application Priority Data

May 15, 2008   (JP) ................................. 2008-128720

(51) Int. Cl.
*G11B 5/86* (2006.01)
(52) U.S. Cl. .......................................... 360/17; 360/16
(58) Field of Classification Search .......................... None
See application file for complete search history.

(56) References Cited

U.S. PATENT DOCUMENTS 6,850,377 B2 *   2/2005   Hashi et al. ..................... 360/17

FOREIGN PATENT DOCUMENTS

| | | |
|---|---|---|
| JP | A 2001-351231 | 12/2001 |
| JP | A 2002-372501 | 12/2002 |
| JP | A 2003-4428 | 1/2003 |
| WO | WO2005/001817 | 1/2005 |

* cited by examiner

*Primary Examiner* — Daniell L Negrón
*Assistant Examiner* — Regina N Holder
(74) *Attorney, Agent, or Firm* — Greer, Burns & Crain, Ltd.

(57) ABSTRACT

A pattern transfer apparatus includes a storage-medium-surface detecting unit that detects a foreign substance or defect on a surface of a storage medium and specifies a position and a size of the foreign substance or defect; a relative-position adjusting unit that adjusts a relative position on a contact surface between the surface of the storage medium and a transfer pattern surface of a transfer master, and a relative-position-adjustment instructing unit that calculates an adjusted value of the relative position according to a detection result, and instructs the relative-position adjusting unit to adjust the relative position based on the adjusted value.

16 Claims, 14 Drawing Sheets

TRANSFER MASTER  STORAGE MEDIUM  TRANSFER MASTER

SERVO PATTERN

SERVO MARK  
GRAY CODE  
INDEX+SECTOR NO.  
POS A  POS B  POS C  POS D

| ANGLE | RADIAL POSITION | SIZE |
|---|---|---|
| $\theta 1$ | R1 | L1 |
| $\theta 2$ | R2 | L2 |
| $\theta 3$ | R3 | L3 |
| ⋮ | ⋮ | ⋮ |

| RADIAL POSITION | STORAGE CAPACITY |
|---|---|
| R1 | C1 |
| R2 | C2 |
| R3 | C3 |
| ⋮ | ⋮ |

PATTERN TRANSFER APPARATUS AND PATTERN TRANSFER METHOD

CROSS-REFERENCE TO RELATED APPLICATION

This application is based upon and claims the benefit of priority of the prior Japanese Patent Application No. 2008-128720, filed on May 15, 2008, the entire contents of which are incorporated herein by reference.

FIELD

The embodiments discussed herein are directed to a pattern transfer apparatus and a pattern transfer method for transferring a pattern of a transfer master, for example a servo pattern, onto a surface of a storage medium of a storage device such as a disk device.

BACKGROUND

Recently, memory density of a storage medium such as a magnetic disk device, a magneto-optical disk device, and an optical disk device has been improved considerably. As a result, downsizing and increase of memory capacity of the storage devices have become possible, thereby improving the conveniences of such devices.

In such a storage medium having a high density, automatic control referred to as servo control has been used for accurately positioning a head on a targeted track. A signal pattern referred to as a servo pattern to be used for the servo control is written on the storage medium.

The servo pattern includes at least a track number, a sector number, and a servo pattern for demodulating a relative position of the head with respect to a track center. In a storage device, for example a magnetic disk device, a servo-pattern transfer process is adopted for transferring a servo pattern included in a transfer master onto a storage medium by magnetic transfer or nanoimprint lithography.

A foreign substance such as dust or defect such as flaw can be present on the surface of a storage medium. In a servo-pattern transfer process, if a servo pattern is transferred to a portion where a foreign substance or defect is present, the transfer of the servo pattern becomes defective. The head cannot be accurately positioned on a targeted track on a storage medium having a defective servo pattern, which has not been transferred accurately, and therefore a corresponding user data storage area cannot be used.

Further, in the servo-pattern transfer process, it is required not to damage its transfer master. Therefore, it is required to detect a foreign substance or defect on a storage medium, to which a servo pattern is transferred, by using an optical test or the like, in order to remove the foreign substance or to discard a storage medium itself without performing transfer of the servo pattern.

As a method of detecting a foreign substance or defect on a surface of a storage medium, there is a method of detecting a foreign substance or defect based on reflected light or scattered light by irradiating laser beams. There is also a method of detecting a foreign substance or defect on a transfer master, like the method of detecting a foreign substance or defect on the surface of the storage medium.

The position of the foreign substance or defect on the storage medium detected in the above manner is overlapped on a servo pattern of a transfer master by pattern matching, to determine whether the position overlaps on the pattern of the transfer master.

Further, there has been proposed a method that a plurality of servo patterns are prepared on a transfer master on the assumption that a foreign substance or defect is always present, to perform transfer to a storage medium, and a servo pattern having the lowest overlapping degree with the foreign substance or defect on a surface of a storage medium is selected and used.

See the documents such as Japanese Laid-open Patent Publication No. 2001-351231, Japanese Laid-open Patent Publication No. 2003-4428, Japanese Laid-open Patent Publication No. 2002-372501, and International Publication Pamphlet No. WO2005/001817.

However, in the conventional techniques, there is a problem such that there have been more demands to form a finer servo pattern on the storage medium, as the memory density of the storage medium has becomes much higher. As the servo pattern becomes finer, there is a problem of finer foreign substance or defect having a size of several micrometers, for example.

Therefore, the foreign substance or defect cannot be completely removed from the surface of the storage medium. Further, there is a limitation on the size of a foreign substance and the like to be measured by an optical detection device, and it is practically difficult to detect a foreign substance or defect with a resolution of nanometer, which can correspond to a requirement of positioning accuracy with the nanometer level.

Further, if it is assumed that a foreign substance or defect is detected from a surface of a storage medium, and the storage medium having the detected foreign substance or defect is to be discarded, a large amount of storage media needs to be discarded before transfer of the servo pattern, thereby causing production cost increase of the storage device.

In the method in which a plurality of servo patterns are prepared on a transfer master to perform transfer to a storage medium, and a servo pattern having the lowest overlapping degree with a foreign substance or defect on a surface of a storage medium is selected and used, there is the following problem.

That is, this method cannot be applied to a storage medium requiring transfer of a fine pattern, such that a certain pattern is formed also in a data area between the servo patterns, such as a discrete track or a bit patterned media.

SUMMARY

According to an aspect of the invention, a pattern transfer apparatus includes a storage-medium-surface detecting unit that detects a foreign substance or defect on a surface of a storage medium and specifies a position and a size of the foreign substance or defect; a relative-position adjusting unit that adjusts a relative position on a contact surface between the surface of the storage medium and a transfer pattern surface of a transfer master, which comes in contact with the surface of the storage medium, the transfer pattern surface magnetically or physically transferring a specified pattern thereto; and a relative-position-adjustment instructing unit that calculates an adjusted value of the relative position according to a detection result by the storage-medium-surface detecting unit, and instructs the relative-position adjusting unit to adjust the relative position based on the adjusted value.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Preferred embodiments of the present invention will be explained with reference to the accompanying drawings. In first to fourth embodiments of the present invention, a storage device is a magnetic disk device and the storage medium is a magnetic disk. However, these are not limited thereto, and the present invention can be applied to a case that a specified pattern is transferred to other memories, for example, various storage media such as an optical disk device such as a compact disk read only memory (CD-ROM) or a digital versatile disk ROM (DVD-ROM), and a magneto-optical disk device such as a magneto-optical disk (MO) or a mini disk (MD).

In the first to fourth embodiments, the specified pattern to be transferred onto the storage medium is a servo pattern. However, the specified pattern is not limited thereto, and various specified patterns such as a magnetic pattern or a physical irregular pattern can be transferred.

[Outline of Servo-Pattern Transfer Process According to Embodiments]

Figure 1:
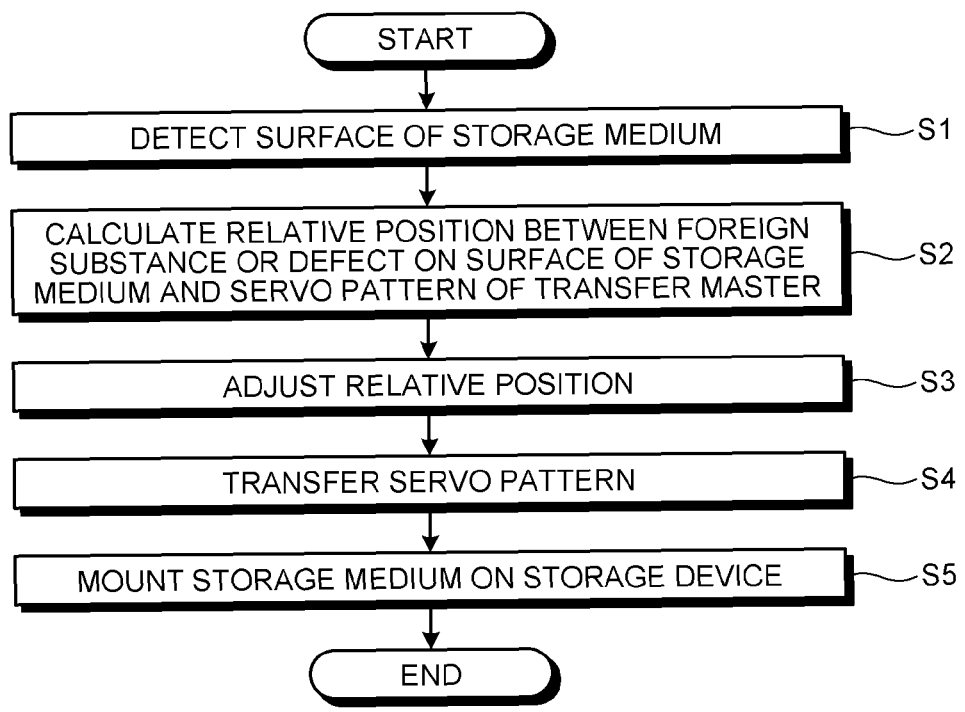
FIG. 1 is a schematic diagram of a servo-pattern transfer process according to an embodiment of the present invention.

Prior to explaining the first to fourth embodiments, an outline of a servo-pattern transfer process according to the embodiments is explained. FIG. 1 is a schematic diagram of the servo-pattern transfer process according to the embodiments.

As shown in FIG. 1, it is detected whether there is a foreign substance (such as dust) or a defect (such as flaw) on the surface of the storage medium before transfer of a servo pattern (Step S1). Subsequently, relative position between a foreign substance or defect on the surface of the storage medium and the servo-pattern of the transfer master is calculated (Step S2).

The relative position expresses a relative position between the foreign substance or defect on the surface of the storage medium and a specified pattern held on a transfer pattern surface of the transfer master when the surface of the storage medium and the transfer pattern surface of the transfer master are brought into contact with each other.

The relative position is expressed by, for example an angle, which is referred to as a relative angle. The relative angle is formed by a segment connecting a foreign substance or defect on the surface of the storage medium with a center thereof, and a segment connecting the specified pattern held on the transfer pattern surface of the transfer master with the center thereof, when the center of the surface of the storage medium and the center of the transfer pattern surface of the transfer master are put together.

The relative position is not limited to the relative angle. For example, the relative position can be expressed by a coordinate. In a relative coordinate, when the center of the surface of the storage medium and the center of the transfer pattern surface of the transfer master are put together, a plane of coordinates, which becomes a reference for either one of the storage medium and the transfer master, is taken. Respective positions of a foreign substance or defect on the surface of the storage medium and the specified pattern of the transfer pattern of the transfer master can be displayed on the plane of coordinates.

Subsequently, at least one of the storage medium and the transfer master is rotated or shifted to adjust the relative position so that insufficient transfer of the transfer pattern due to superposed foreign substance or defect on the surface of the storage medium on the transfer pattern is avoided or reduced (Step S3).

Subsequently, the servo pattern is magnetically or physically transferred onto the storage medium (Step S4). The storage medium onto which the servo pattern is transferred is mounted on the storage device (Step S5).

[Formation Example of Servo Pattern]

Figure 2:
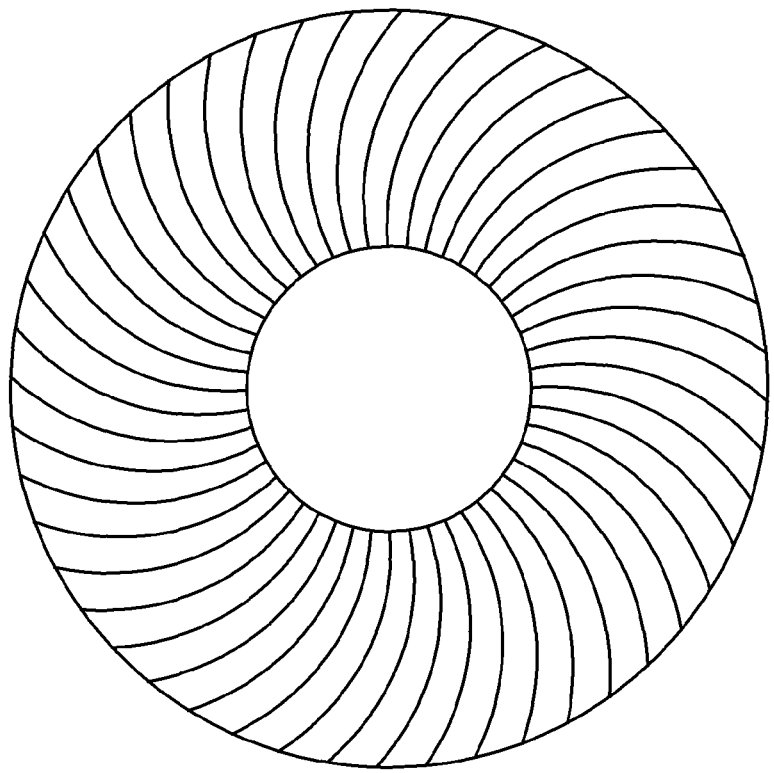
FIG. 2 is a formation example of a servo pattern on a storage medium.

A formation example of the servo pattern formed on the storage medium is explained next. FIG. 2 is a formation example of the servo pattern on the storage medium. As shown in FIG. 2, the servo pattern is information held by the storage device and used for positioning the head for reading and writing information between the storage medium and the storage device. As shown in FIG. 2, a plurality of servo patterns extending in a circular arc shape from a center of rotation to a radial direction is recorded on the storage medium.

As shown in FIG. 2, on the surface of the storage medium, the servo pattern is arranged with equal intervals from the center of the storage medium toward a circumference as a circular arc substantially along the radial direction. The reason why the servo pattern is in the circular arc shape is as follows.

That is, in the storage device, a head actuator fitted with a floating head slider having a head at the end thereof swings in a fan shape, designating a central axis of a spindle as an axis of rotation. A distance from the central axis to the head is made constant, when the head traces the servo pattern between opposite ends of internal and external circumferences.

[Outline of Transfer of Servo Pattern]

Figure 3:
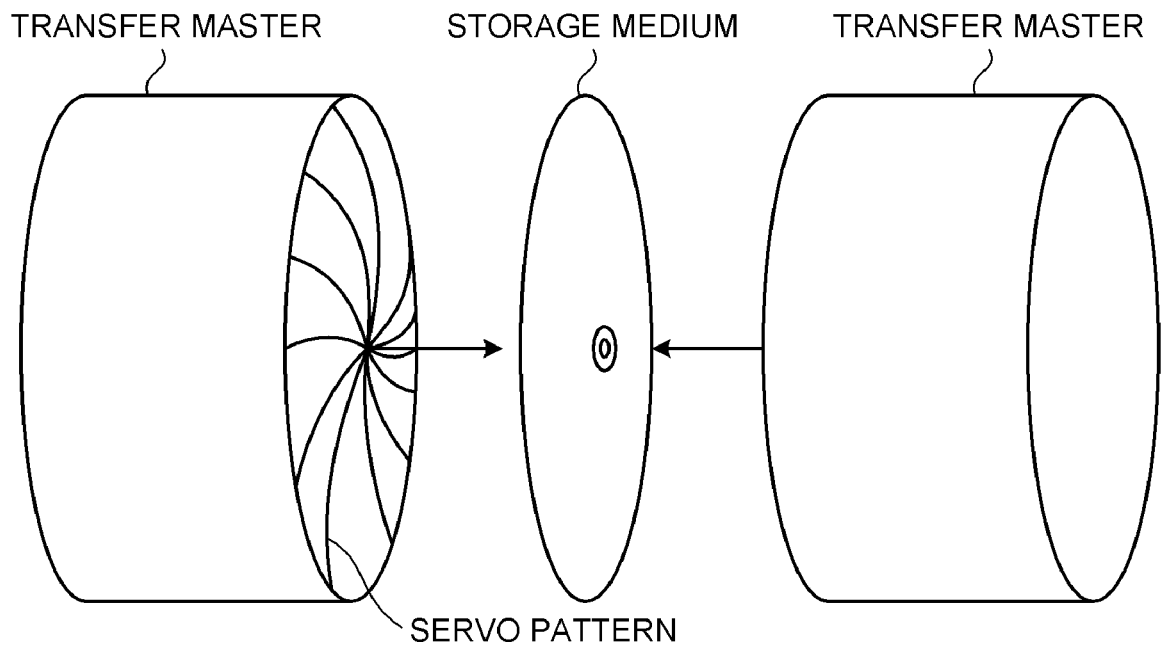
FIG. 3 depicts an outline of transfer of the servo pattern onto the storage medium.

An outline of transfer of the servo pattern onto the storage medium is explained next. FIG. 3 depicts the outline of transfer of the servo pattern onto the storage medium. As shown in FIG. 3, when the servo pattern is transferred onto the storage medium by using the transfer master, the servo pattern is generally transferred onto both surfaces of the storage medium. It is because the storage medium has a storage area on both surfaces.

As shown in FIG. 3, the two transfer masters having the transfer pattern surface including the servo pattern to be transferred to the storage medium are pressed to the storage medium to put the storage medium therebetween. A magnetic field is generated or pressure for putting the storage medium between the two transfer masters is applied in a state with the two transfer masters being pressed against the storage medium, thereby transferring the servo pattern onto the opposite surfaces of the storage medium.

When only one face of the storage medium is used as the storage area, the transfer master is arranged only on the face onto which the servo pattern is transferred, and the other face can be a member capable of putting the storage medium together with the transfer master, instead of the transfer master.

[Details of Servo Pattern]

Figure 4:
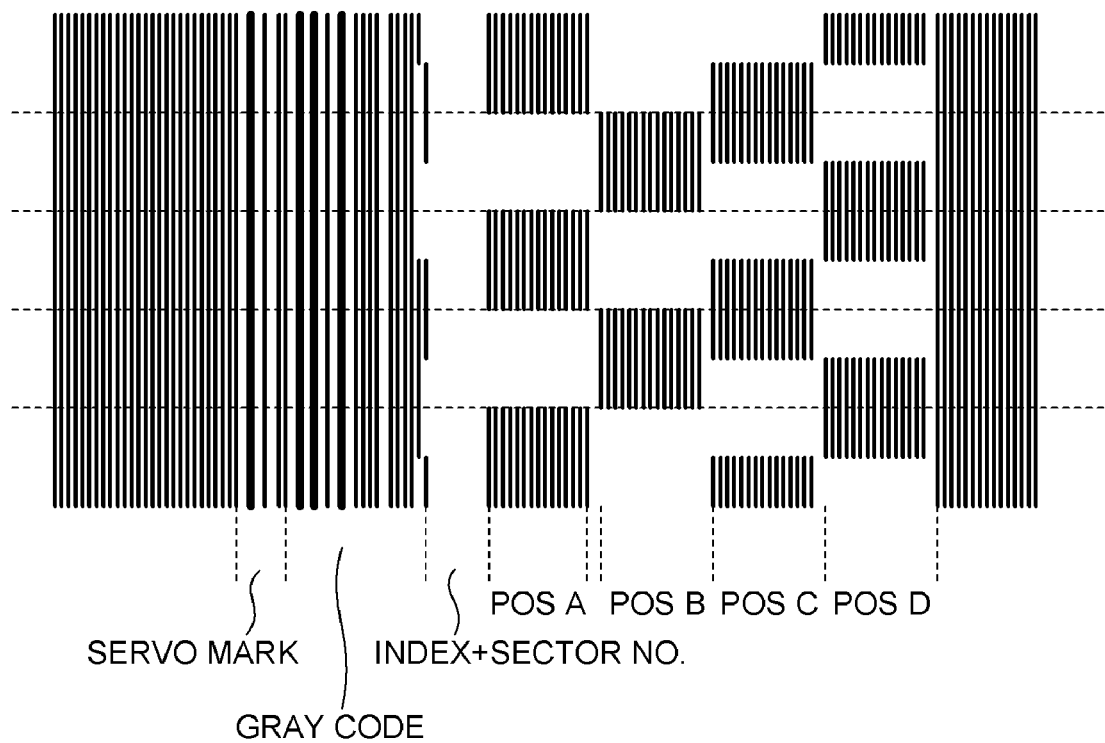
FIG. 4 is an enlarged view of the servo pattern.

Details of the servo pattern are explained next. FIG. 4 is an enlarged view of the servo pattern shown in FIG. 2. In FIG. 4, a part of the servo pattern in the radial direction in one sector is extracted and displayed in an enlarged scale. The servo pattern is a magnetic pattern or a physically formed irregular pattern.

In the servo pattern in one sector, a servo mark, a gray code, an index and sector number ("Index+Sector No." in the drawings), and burst signals A to D (Pos A to D) are arranged in order of read by the head. The pieces of information indicated by these servo patterns are read along the center of respective tracks, thereby reproducing the servo signal.

The servo mark is information indicating start of the servo pattern. The gray code and the index and sector number are areas in which a binary-coded decimal number is stored, respectively. The gray code stores a track number of the storage medium. The index and sector stores the index and sector number of the sector having the track number. The burst signals A to D (Pos A to D) have relative position information of the head with respect to the track.

[Signal Waveform when Servo Pattern is Reproduced by Head]

Figure 5:
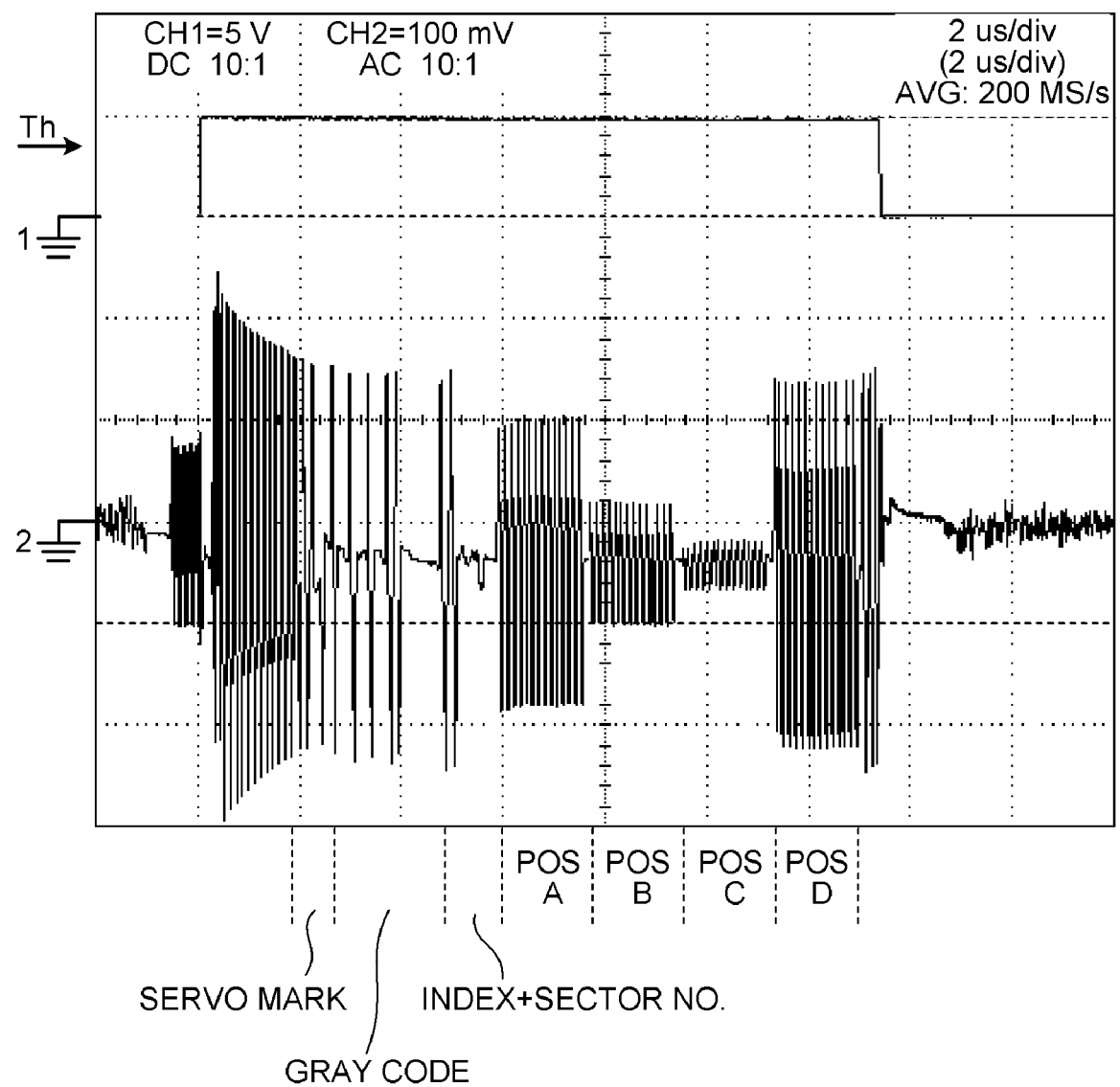
FIG. 5 is one example of a signal waveform when the servo pattern on the storage medium is reproduced by a head.

A signal waveform when the servo pattern on the storage medium is reproduced by the head is explained next. FIG. 5 is one example of the signal waveform when the servo pattern on the storage medium is reproduced by the head.

In FIG. 5, a reproduced waveform appears corresponding to the servo mark, the gray code, the index and sector number, and the burst signals A to D (Pos A to D) shown in FIG. 4. If these reproduced waveforms cannot be obtained normally, positioning of the head is not possible, and therefore a corresponding user-data storage area cannot be used, thereby causing a loss of memory capacity.

As it is closer to the periphery of the storage medium, the capacity of the user-data storage area corresponding to the servo pattern of one sector on one track increases. Therefore, the problem of insufficient transfer of the servo pattern is more likely to occur on the periphery of the storage medium.

One Example of First Embodiment

Figure 6:
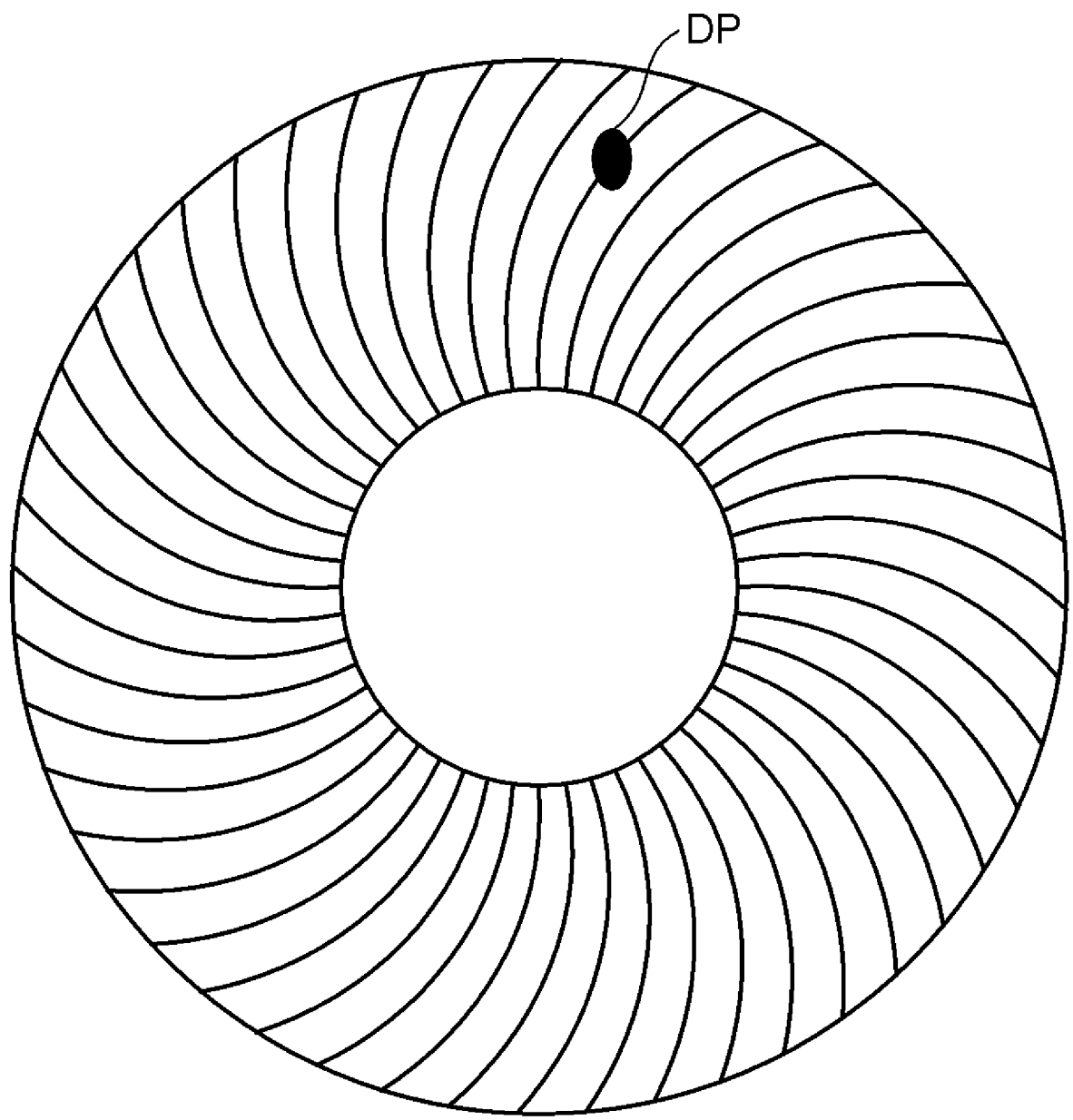
FIG. 6 is one example when, in a first embodiment of the present invention, there is a problem of a foreign substance or defect on the storage medium.
Figure 7:
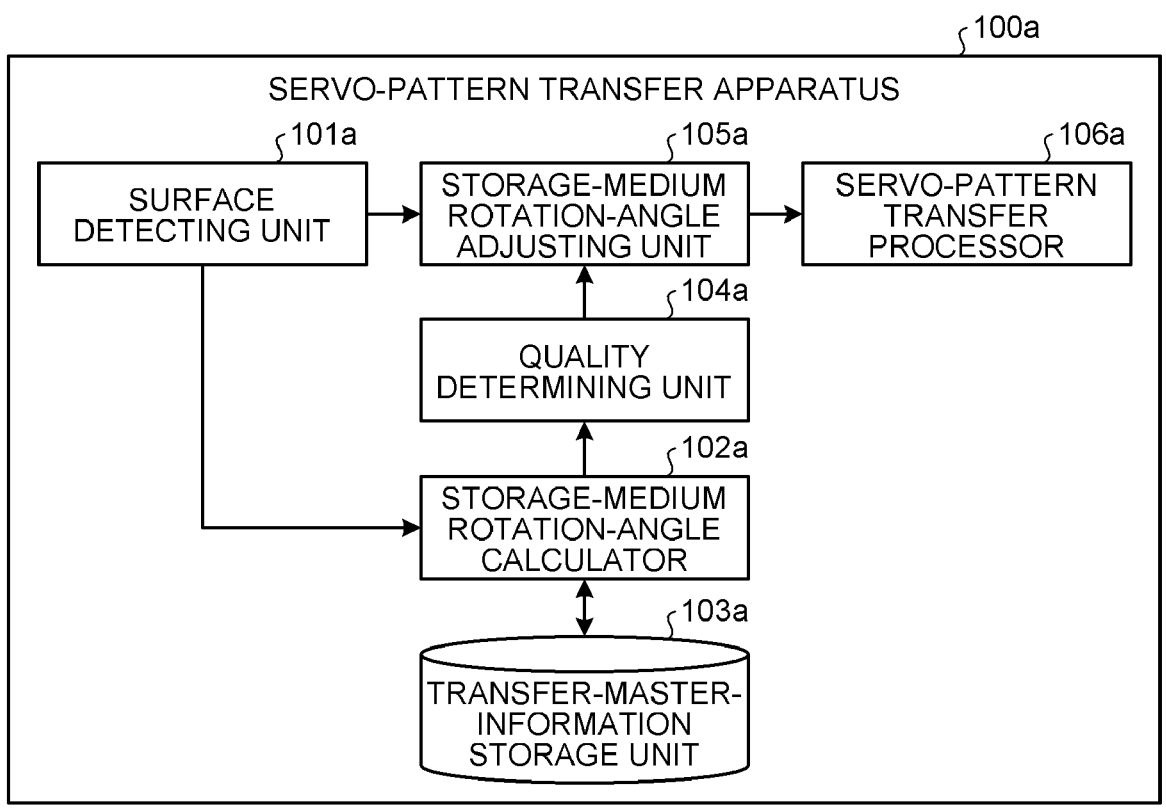
FIG. 7 is a functional block diagram of a configuration of a servo-pattern transfer apparatus according to the first embodiment.
Figure 8:
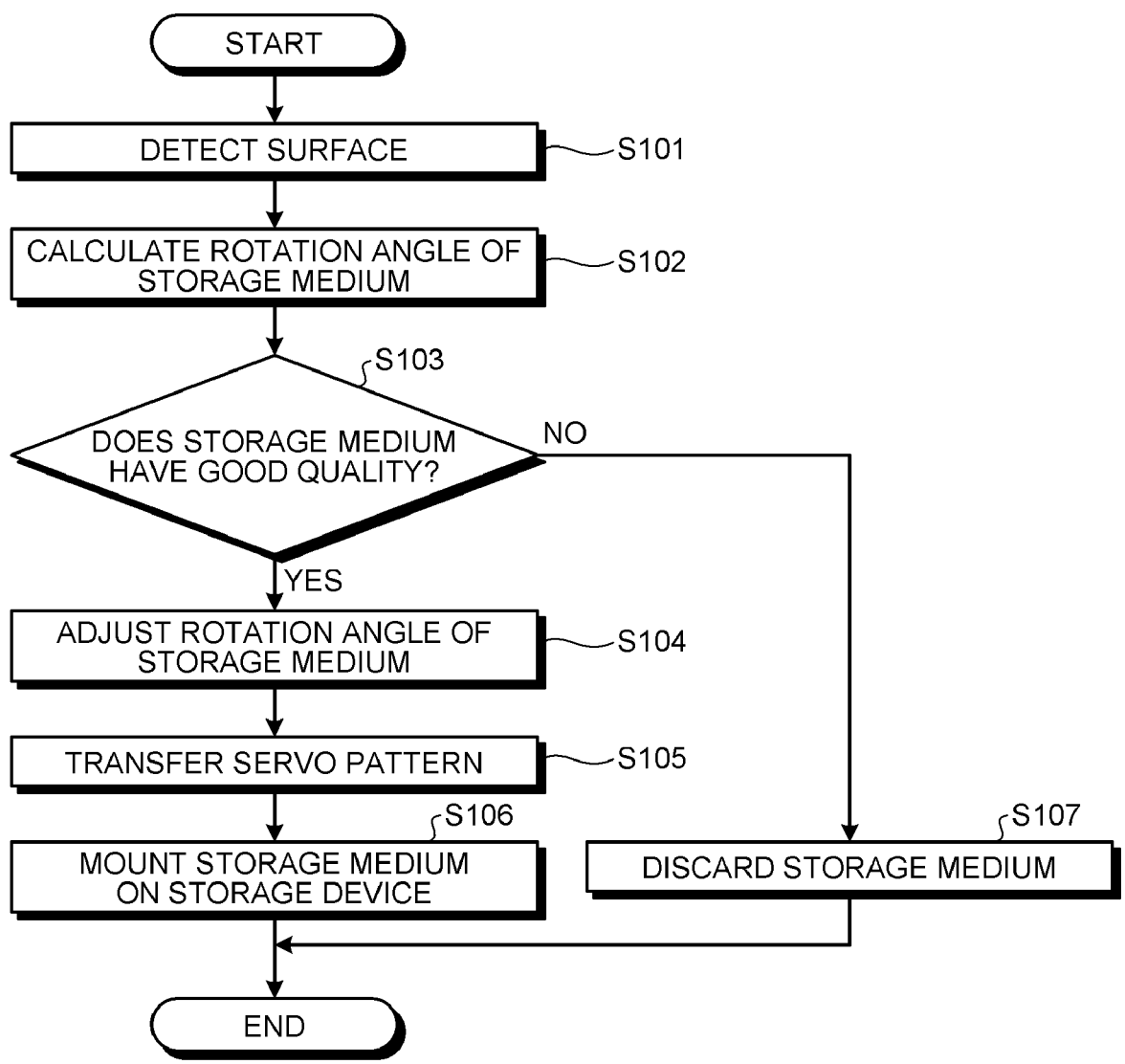
FIG. 8 is a flowchart of a servo-pattern transfer process procedure according to the first embodiment.

One example of the first embodiment is explained with reference to FIGS. 6 to 8. In the first embodiment, a problem of a foreign substance or defect on the storage medium is explained. FIG. 6 is one example when, in the first embodiment, there is a problem of a foreign substance or defect on the storage medium.

As shown in FIG. 6, on the surface of the storage medium, if a foreign substance or defect DP is superposed on the servo pattern and written, the servo pattern cannot reproduce the servo signal accurately due to insufficient transfer. Accordingly, the user-data storage area corresponding to the track of the servo pattern cannot be used.

In some cases, all the user-data storage areas on the corresponding track cannot be used due to the foreign substance or defect DP superposed on the servo pattern and written. The first embodiment solves this problem.

A configuration of the servo-pattern transfer apparatus according to the first embodiment is explained next. FIG. 7 is a functional block diagram of the configuration of the servo-pattern transfer apparatus. As shown in FIG. 7, a servo-pattern transfer apparatus 100a according to the first embodiment includes a surface detecting unit 101a, a storage-medium rotation-angle calculator 102a, a transfer-master-information storage unit 103a, a quality determining unit 104a, a storage-medium rotation-angle adjusting unit 105a, and a servo-pattern transfer processor 106a.

The surface detecting unit 101a detects a foreign substance or defect on the surface of the storage medium, and can use a well-known technique. The storage-medium rotation-angle calculator 102a calculates a relative angle between a foreign substance or defect on the surface of the storage medium and the transfer pattern of the transfer master having a possibility of being superposed on the foreign substance or defect. When the relative angle is less than a first threshold, the storage-medium rotation-angle calculator 102a calculates a rotation angle for rotating the storage medium around the center of the storage medium, so that the relative angle becomes equal to or larger than a second threshold.

The relative angle being less than the first threshold indicates a state where the foreign substance or defect on the surface of the storage medium is superposed on the transfer pattern of the transfer mask. Further, the relative angle being equal to or larger than the second threshold indicates a state in which there is no superposed portion between the foreign substance or defect on the surface of the storage medium and the transfer pattern of the transfer mask, and superposition is avoided.

The rotation angle for rotating the storage medium around the center of the storage medium to make the relative angle equal to or larger than the second threshold, when the relative angle is less than the first threshold, is referred to as an adjusted value of the relative angle.

The transfer-master-information storage unit 103a stores information indicating a formation state of the servo pattern on the transfer pattern surface of the transfer master. The information indicating the formation state of the servo pattern on the transfer pattern surface includes, for example, a number N of servo patterns to be transferred onto the surface of the storage medium, and a width W of the servo pattern for each track.

For example, when an angle of 360 degrees is divided by the number N, an angle formed by center lines of the adjacent servo patterns in the radial direction can be obtained. When a length of one round of a certain track is assumed to be L1, a length L2 of the user-data storage area between the adjacent servo patterns in the track can be obtained based on (L1−N× W)÷N.

The storage-medium rotation-angle calculator 102a calculates the adjusted value of the relative angle, for example, by using the various numerical values described above, so that there is no superposed portion between the foreign substance or defect on the surface of the storage medium and the transfer pattern of the transfer master, to avoid superposition.

Further, for example, when there are a plurality of foreign substances or defects on the surface of the storage medium, the storage-medium rotation-angle calculator 102a calculates the adjusted value of the relative angle so that a degree of superposition between the foreign substances or defects on the surface of the storage medium and the transfer pattern of the transfer master having a possibility of being superposed on the foreign substances or defects becomes the smallest in the following manner. A function $\delta_i(\theta)$ defined by the following equation is introduced.

$$\delta_i(\theta) \equiv \begin{cases} 1 & \text{Case that servo pattern of transfer master is} \\ & \text{overlapped on foreign substance or defect } i \text{ on} \\ & \text{storage medium when rotation angle is } \theta \\ 0 & \text{Case that servo pattern of transfer master is not} \\ & \text{overlapped on foreign substance or defect } i \text{ on} \\ & \text{storage medium when rotation angle is } \theta \end{cases} \quad (1)$$

Foreign substances or defects on the surface of the storage medium are identified by index i. At this time, for example, an adjusted value "$\theta_{adj}$" of the relative angle is calculated based on the following equation.

$$Adj = \min_\theta \left[ \sum_i \{(Li \times Ri) \times \delta_i(\theta)\} \right] \quad (2)$$

where $L_i$ denotes a radial length of the foreign substance or defect i on the storage medium, and $R_i$ denotes a radial position of the foreign substance or defect i on the storage medium.

"Σ" on the right side in the equation (2) denotes a sum of all foreign substances or defects i, and "min" denotes a minimum value "Adj" when all of "θ" are scanned. The "θ" when the minimum value Adj is obtained is the adjusted value "$\theta_{adj}$" of the relative angle.

The quality determining unit 104a determines whether, for example, the minimum value "Adj" calculated by the equation (2) is equal to or less than a predetermined threshold. It is because if a superposed amount between the foreign substance or defect on the storage medium and the servo pattern of the transfer master is large, the loss amount of the memory capacity of the storage medium increases even if the rotation angle of the storage medium is adjusted, and the storage medium cannot be used anymore.

When determining that the minimum value "Adj" is equal to or less than the predetermined threshold, the quality determining unit 104a instructs the storage-medium rotation-angle adjusting unit 105a to rotate the storage medium by the adjusted value "$\theta_{adj}$". When the quality determining unit 104a determines that the minimum value "Adj" exceeds the predetermined threshold, the storage medium is discarded.

It is not always necessary that the quality determining unit 104a performs the quality determination by the condition described above. For example, the quality determining unit 104a can perform the quality determination according to any condition such as the number or the size of foreign substances or defects on the surface of the storage medium detected by the surface detecting unit 101a, or a combination thereof.

The quality determining unit 104a is not an essential configuration. When the quality determining unit 104a is not included, the quality determination is not performed, and the storage-medium rotation-angle adjusting unit 105a can rotate the storage medium according to the adjusted value of the relative angle calculated by the storage-medium rotation-angle calculator 102a.

The storage-medium rotation-angle adjusting unit 105a rotates the storage medium by the adjusted value of the relative angle calculated by the storage-medium rotation-angle calculator 102a, and controls so that the superposition of the foreign substance or defect on the surface of the storage medium and the transfer pattern of the transfer master is avoided.

The servo-pattern transfer processor 106a transfers the servo pattern of the transfer master onto the surface of the storage medium with the relative angle adjusted by the rotation by the storage-medium rotation-angle adjusting unit 105a.

A servo-pattern transfer process according to the first embodiment is explained next. FIG. 8 is a flowchart of a servo-pattern transfer process procedure according to the first embodiment. As shown in FIG. 8, the surface detecting unit 101a first detects whether there is a foreign substance or defect on the surface of the storage medium, onto which the servo pattern is to be transferred (Step S101).

Subsequently, the storage-medium rotation-angle calculator 102a calculates the rotation angle of the storage medium required for avoiding the superposition of the foreign substance or defect on the surface of the storage medium and the transfer pattern of the transfer master (Step S102).

Subsequently, the quality determining unit 104a determines whether the storage medium has good quality (Step S103). When the storage medium is determined to have good quality (Yes at Step S103), control proceeds to Step S104. When the storage medium is determined not to have good quality (No at Step S103), control proceeds to Step S107.

At Step S104, the storage-medium rotation-angle adjusting unit 105a rotates the storage medium by the rotation angle of the storage medium required for avoiding the superposition of the foreign substance or defect on the surface of the storage medium and the transfer pattern of the transfer master calculated at Step S102.

Subsequently, the servo-pattern transfer processor 106a transfers the servo pattern from the transfer master onto the storage medium (Step S105). The servo-pattern transfer apparatus 100a then mounts the storage medium having the transferred servo pattern on the memory (Step S106). On the other hand, at Step S107, the servo-pattern transfer processor 106a discards the storage medium.

According to the first embodiment, because the storage medium is rotated for avoiding the superposition of the foreign substance or defect on the surface of the storage medium and the transfer pattern of the transfer master, a lightweight storage medium is rotated, and therefore a rotation mechanism can have a simple configuration, thereby enabling to manufacture the servo-pattern transfer apparatus at a low cost.

One Example of Second Embodiment

Figure 9:
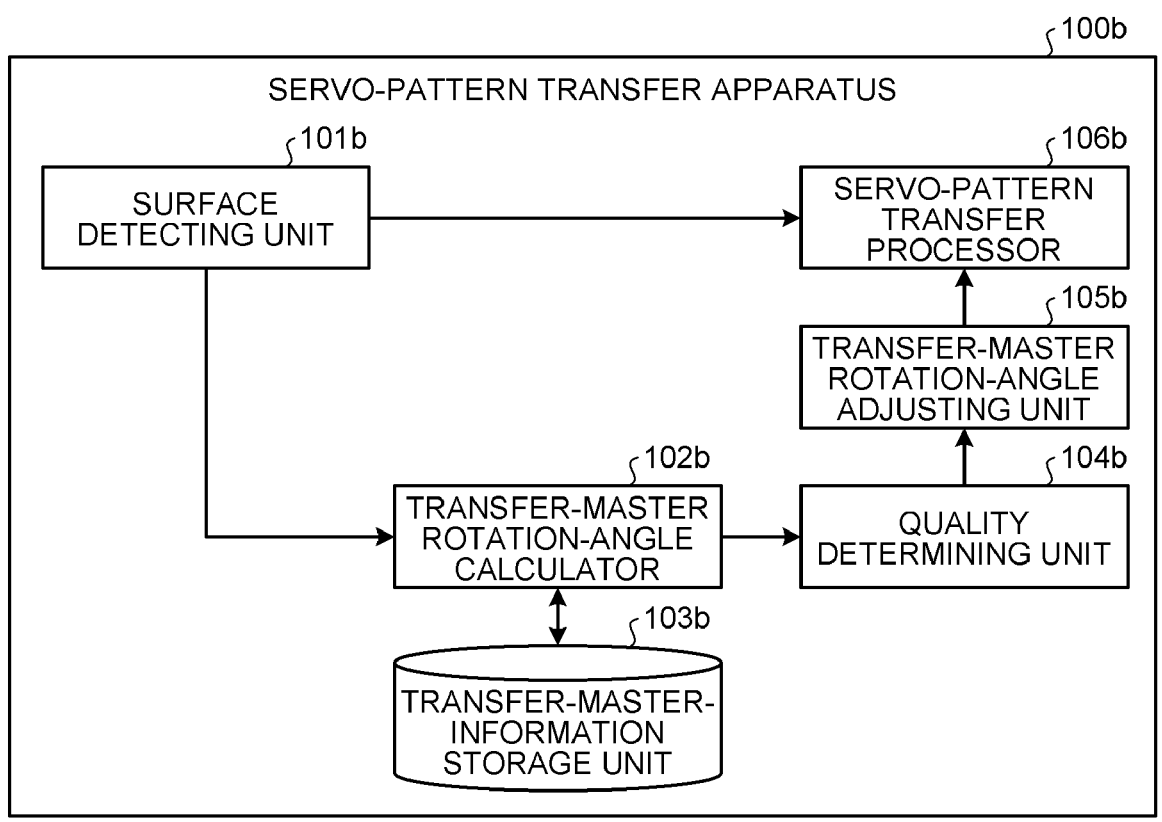
FIG. 9 is a functional block diagram of a configuration of a servo-pattern transfer apparatus according to a second embodiment of the present invention.

One example of the second embodiment is explained with reference to FIGS. 9 and 10. A configuration of the servo-pattern transfer apparatus according to the second embodiment is explained first. FIG. 9 is a functional block diagram of the configuration of the servo-pattern transfer apparatus. In the explanations of the second embodiment, only different features from those of the first embodiment are explained.

As shown in FIG. 9, a servo-pattern transfer apparatus 100b according to the second embodiment includes a surface detecting unit 101b, a transfer-master rotation-angle calculator 102b, a transfer-master-information storage unit 103b, a quality determining unit 104b, a transfer-master rotation-angle adjusting unit 105b, and a servo-pattern transfer processor 106b.

Because the surface detecting unit 101b, the transfer-master-information storage unit 103b, the quality determining unit 104b, and the servo-pattern transfer processor 106b have the same functional configuration as that of the surface detecting unit 101a, the transfer-master-information storage unit 103a, the quality determining unit 104a, and the servo-pattern transfer processor 106a, respectively, explanations thereof will be omitted.

The transfer-master rotation-angle calculator 102b calculates the relative angle between the foreign substance or defect on the surface of the storage medium and the transfer pattern of the transfer master having a possibility of being superposed on the foreign substance or defect. When the relative angle is less than the first threshold, the transfer-master rotation-angle calculator 102b calculates a rotation angle for rotating the transfer master around the center of a cross section of the transfer master so that the relative angle becomes equal to or larger than the second threshold. Other functions are the same as those of the storage-medium rotation-angle calculator 102a.

The transfer-master rotation-angle adjusting unit 105b rotates the transfer master by the adjusted value of the relative angle calculated by the transfer-master rotation-angle calculator 102b, and controls so that the superposition of the foreign substance or defect on the surface of the storage medium and the transfer pattern of the transfer master is avoided.

The servo-pattern transfer process according to the second embodiment is explained next. FIG. 10 is a flowchart of the servo-pattern transfer process procedure according to the second embodiment. Because Steps S201 and S203 to S207 in FIG. 10 are the same as Steps S101 and S103 to S107 shown in FIG. 8, explanations thereof will be omitted.

Figure 10:
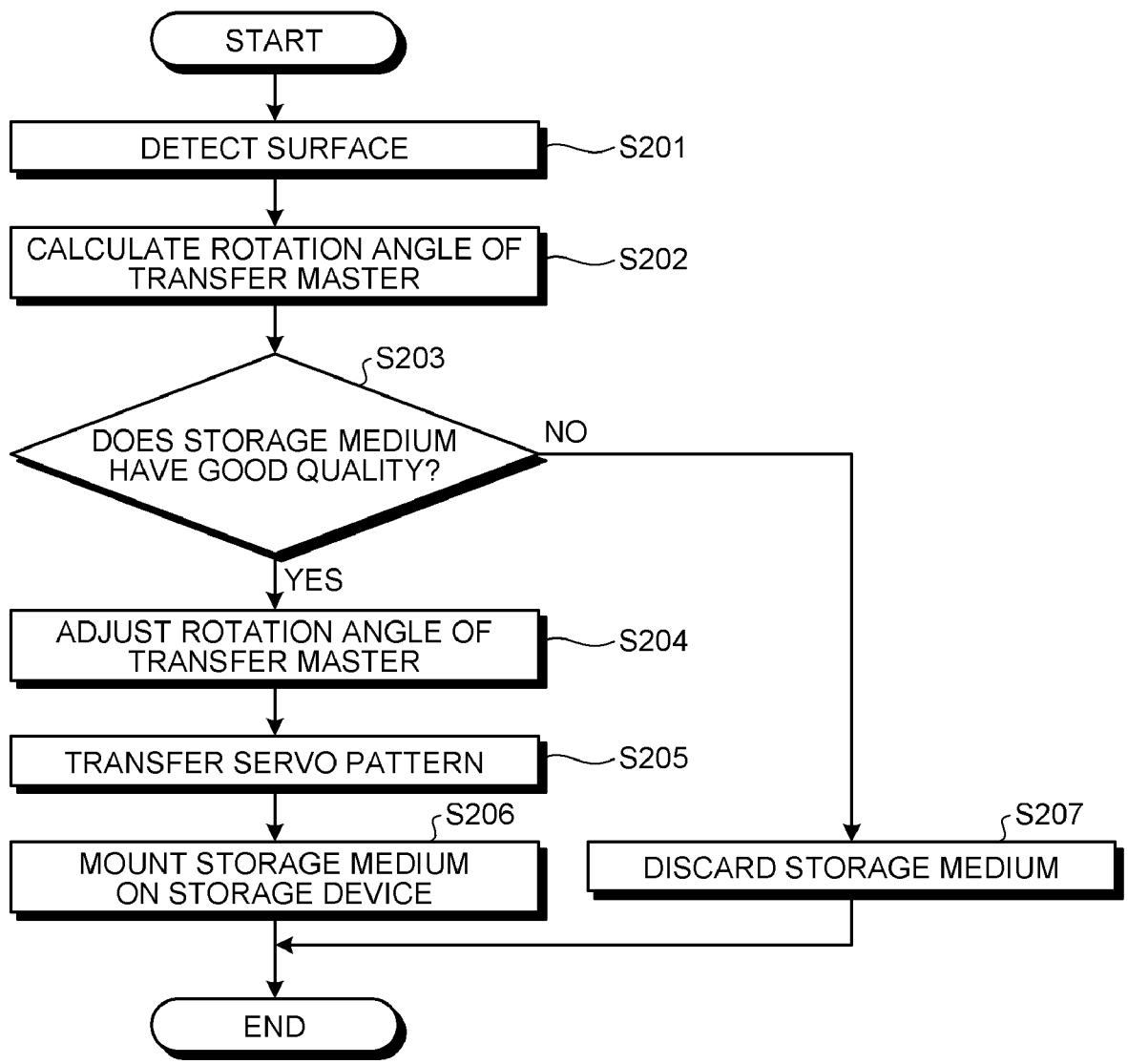
FIG. 10 is a flowchart of a servo-pattern transfer process procedure according to the second embodiment.

In FIG. 10, at Step S202, the transfer-master rotation-angle calculator 102b calculates the relative angle of the transfer master required for avoiding the superposition of the foreign substance or defect on the surface of the storage medium and the transfer pattern of the transfer master.

At Step S204, the transfer-master rotation-angle adjusting unit 105b rotates the transfer master by the rotation angle of the transfer master required for avoiding the superposition of the foreign substance or defect on the surface of the storage medium and the transfer pattern of the transfer master calculated at Step S202.

Figure 11:
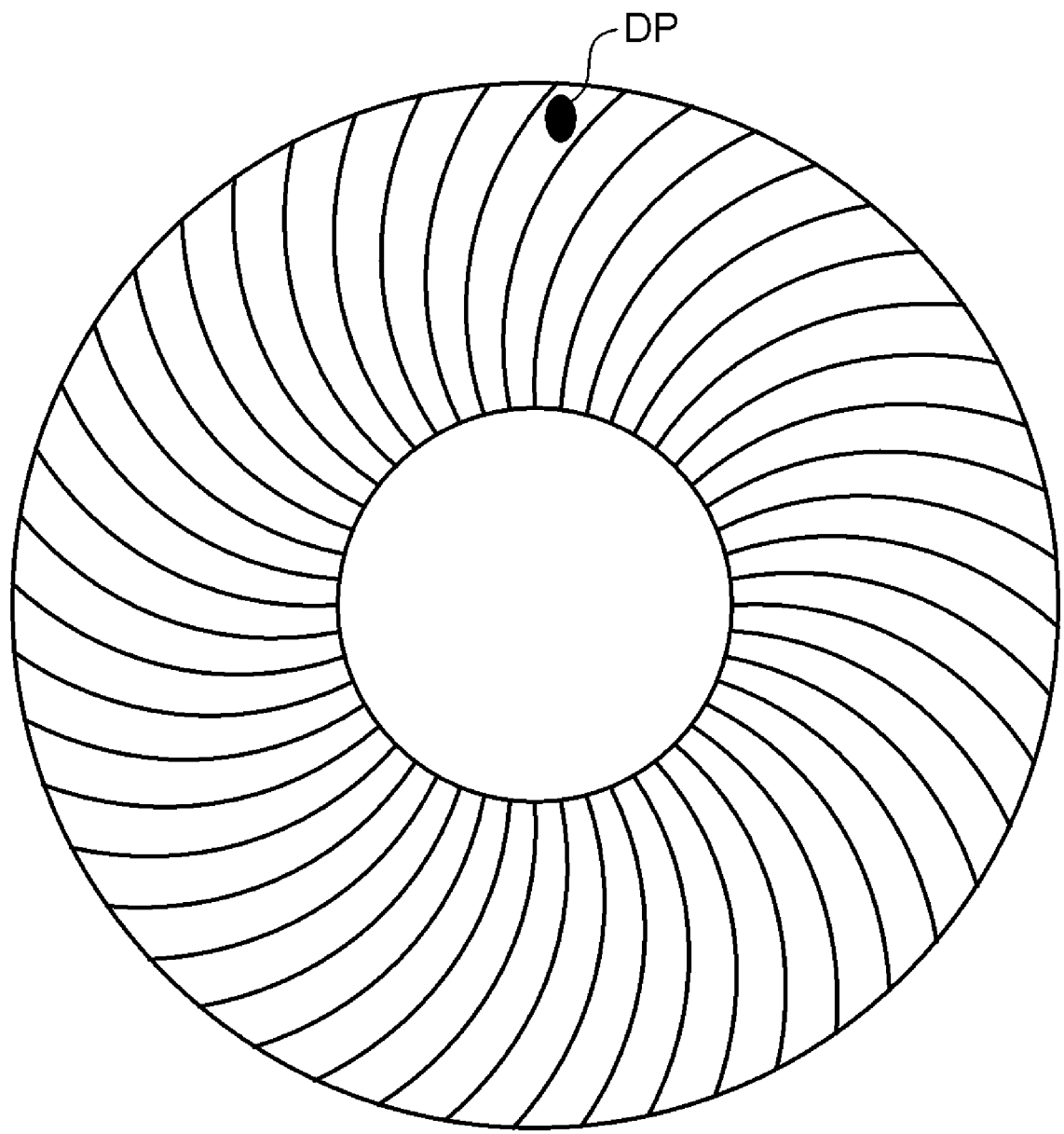
FIG. 11 is one example in which a servo pattern is written by avoiding a foreign substance or defect on the storage medium by the servo-pattern transfer process in the first and second embodiments.

According to the first and second embodiments, because the storage medium or the transfer master is rotated to avoid the superposition of the foreign substance or defect on the surface of the storage medium and the transfer pattern of the transfer master (for example, see FIG. 11), insufficient transfer of the servo pattern prevented or reduced, and a discarded amount of the storage medium is decreased, thereby enabling to reduce the manufacturing cost of the storage device.

To avoid the superposition of the foreign substance or defect on the surface of the storage medium and the transfer pattern of the transfer master, the storage medium is rotated in the first embodiment and the transfer master is rotated in the second embodiment. However, both of the storage medium and the transfer master can be rotated for avoiding the superposition of the foreign substance or defect on the surface of the storage medium and the transfer pattern of the transfer master. Accordingly, the adjustment time of the relative angle for avoiding the superposition of the foreign substance or defect on the surface of the storage medium and the transfer pattern of the transfer master can be reduced.

One Example of Third Embodiment

Figures 12, 13:
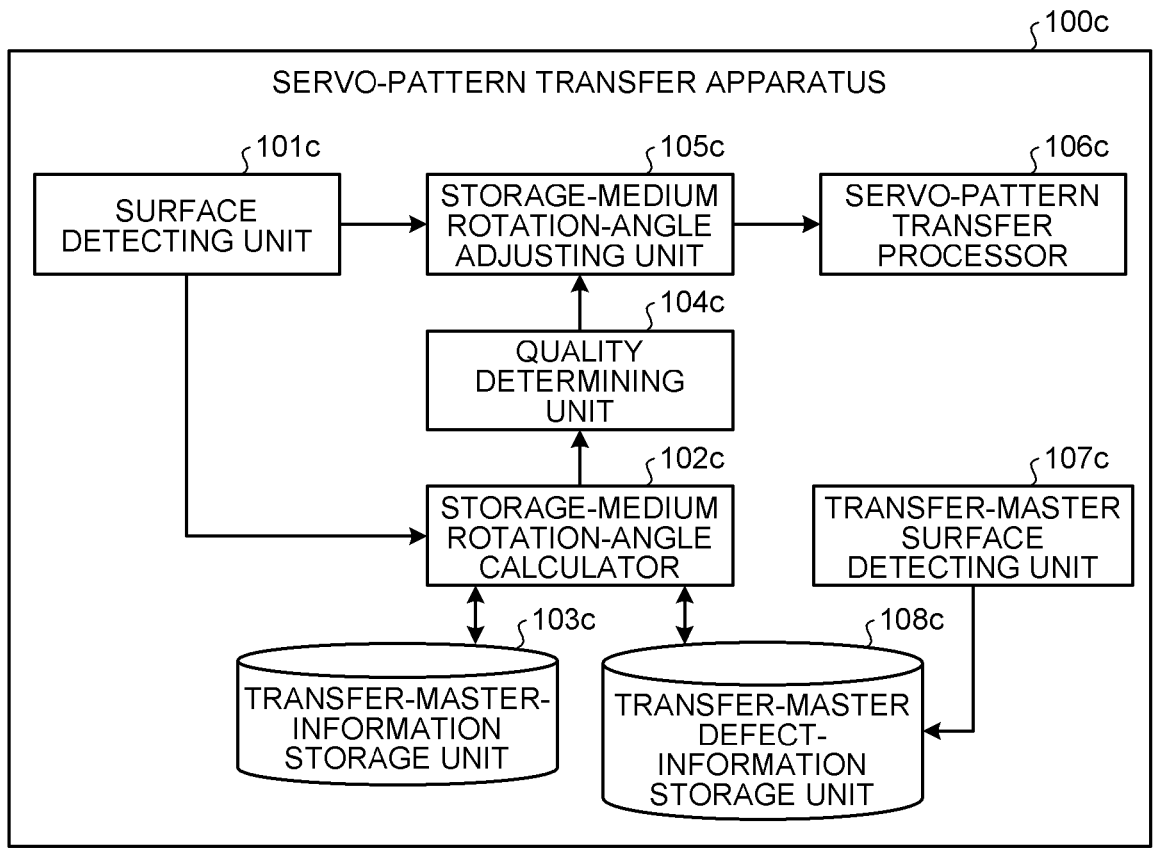
FIG. 12 is a functional block diagram of a configuration of a servo-pattern transfer apparatus according to a third embodiment of the present invention.
FIG. 13 is one example of a transfer-master defect information table.
Figure 14:
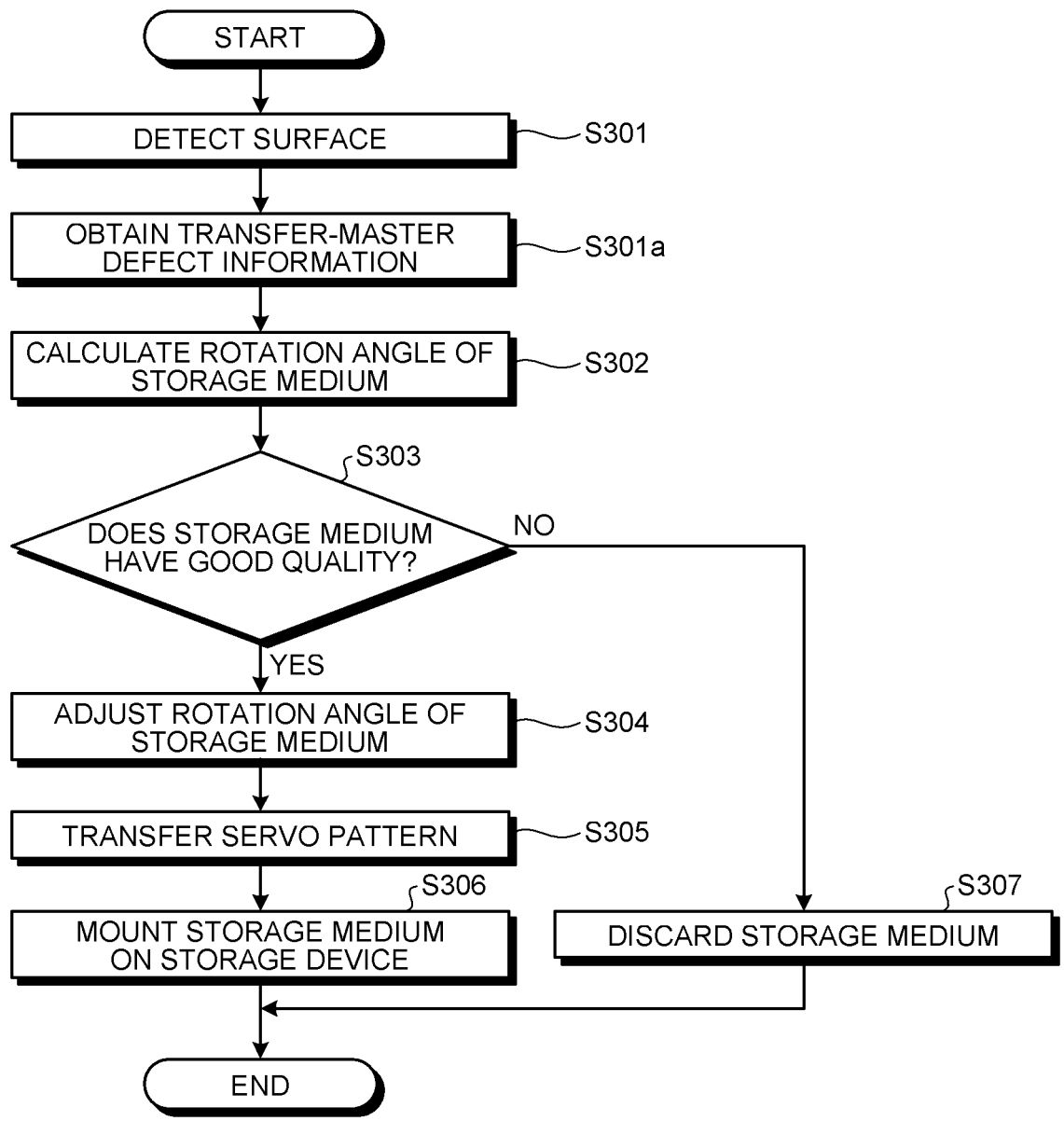
FIG. 14 is a flowchart of a servo-pattern transfer process procedure according to the third embodiment.

One example of the third embodiment is explained with reference to FIGS. 12 to 14. FIG. 12 is a functional block diagram of a configuration of the servo-pattern transfer apparatus according to the third embodiment. In the explanations of the third embodiment, only different features from those of the first embodiment are explained.

As shown in FIG. 12, a servo-pattern transfer apparatus 100c according to the third embodiment includes a surface detecting unit 101c, a storage-medium rotation-angle calculator 102c, a transfer-master-information storage unit 103c, a quality determining unit 104c, a storage-medium rotation-angle adjusting unit 105c, a servo-pattern transfer processor 106c, a transfer-master surface detecting unit 107c, and a transfer-master defect-information storage unit 108c.

Because the surface detecting unit 101c, the storage-medium rotation-angle calculator 102c, the transfer-master-information storage unit 103c, the quality determining unit 104c, and the servo-pattern transfer processor 106c have respectively the same functional configuration as that of the surface detecting unit 101a, the storage-medium rotation-angle calculator 102a, the transfer-master-information storage unit 103a, the quality determining unit 104a, and the servo-pattern transfer processor 106a of the servo-pattern transfer apparatus 100a, explanations thereof will be omitted.

Figure 15:
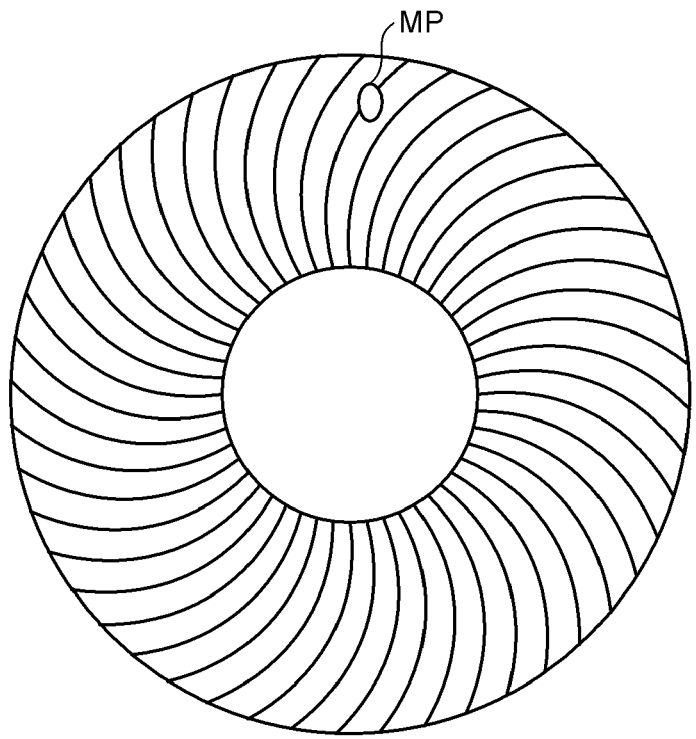
FIG. 15 is one example when, in the third embodiment, there is a problem of defect on a transfer master.

The transfer-master surface detecting unit 107c detects a foreign substance or defect on the surface of the transfer master, and can use a well-known technique. A detection result by the transfer-master surface detecting unit 107c is stored in the transfer-master defect-information storage unit 108c. For example, as shown in FIG. 15, it is assumed that there is a foreign substance or defect MP on the servo pattern on the transfer pattern surface of the transfer master.

The detection result to be stored in the transfer-master defect-information storage unit 108c is, for example, as shown in a transfer-master defect information table in FIG. 13. The transfer-master defect information for specifying a foreign substance or defect MP on the surface of the transfer master is specified by, for example, an angle from a reference radius, a radial position, and the size.

Figure 16:
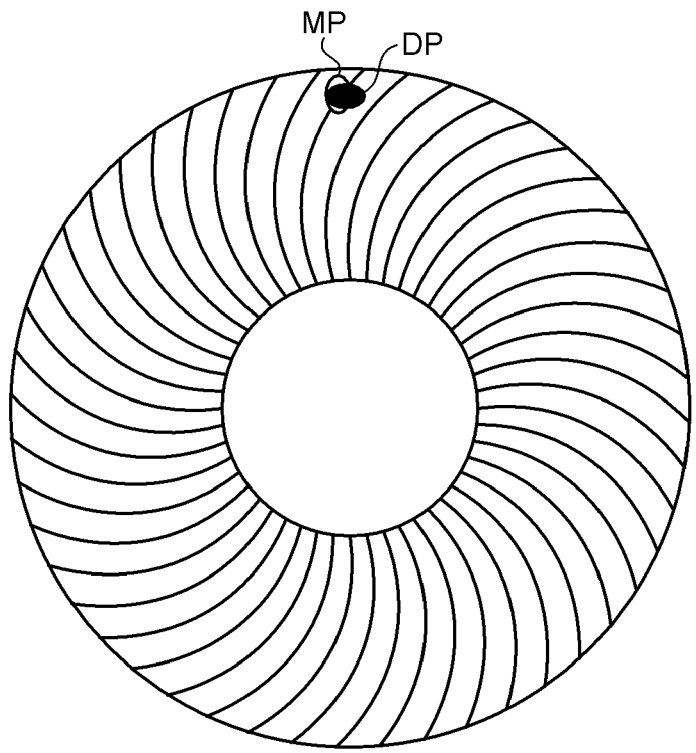
FIG. 16 is one example in which a servo pattern is written by avoiding a foreign substance or defect on a storage medium, by superposing a foreign substance or defect on the storage medium on a foreign substance or defect on a transfer master.

The storage-medium rotation-angle calculator 102c calculates the foreign substance or defect on the surface of the storage medium and the relative angle of the transfer-master defect information. When the relative angle is within a predetermined range, the storage-medium rotation-angle calculator 102c determines that the foreign substance or defect on the surface of the storage medium superposes on the foreign substance or defect on the transfer pattern surface of the transfer master, and sets such that superposition of the foreign substance or defect on the surface of the storage medium on the servo pattern is not avoided. That is, when the foreign substance or defect on the surface of the storage medium superposes on the foreign substance or defect on the transfer pattern surface of the transfer master, the storage-medium rotation-angle calculator 102c allows the superposition (for example, see FIG. 16).

The storage-medium rotation-angle calculator 102c calculates the relative angle between the foreign substance or defect on the surface of the storage medium and the transfer pattern of the transfer master having the possibility of being superposed on the foreign substance or defect, excluding the foreign substance or defect on the surface of the storage medium, for which superposition is not avoided. When the relative angle is less than a first threshold, the storage-medium rotation-angle calculator 102c calculates the rotation angle for rotating the storage medium around the center of the storage medium, so that the relative angle becomes equal to or larger than a second threshold.

The servo-pattern transfer process according to the third embodiment is explained next. FIG. 14 is a flowchart of the servo-pattern transfer process procedure according to the third embodiment. Because Step S301 and steps S302 to S307 in FIG. 14 are respectively the same as Step S101 and steps S102 to S107 shown in FIG. 8, explanations thereof will be omitted.

At Step S301a, the transfer-master surface detecting unit 107c detects the foreign substance or defect on the surface of the transfer master, and stores the detection result in the transfer-master defect-information storage unit 108c. At Step S302, the storage-medium rotation-angle calculator 102c calculates the relative angle between the foreign substance or defect on the surface of the storage medium and the transfer pattern of the transfer master having the possibility of being superposed on the foreign substance or defect, taking the transfer-master defect information into consideration. When the relative angle is less than the first threshold, the storage-medium rotation-angle calculator 102c calculates the rotation angle for rotating the storage medium around the center of the storage medium, so that the relative angle becomes equal to or larger than a second threshold.

In the third embodiment, the storage medium is rotated for avoiding the superposition of the foreign substance or defect on the surface of the storage medium on the transfer pattern of the transfer master having the possibility of being superposed on the foreign substance or defect. However, the present invention is not limited thereto, and the transfer master can be rotated or both of the storage medium and the transfer master can be rotated.

One Example of Fourth Embodiment

Figures 17, 18:
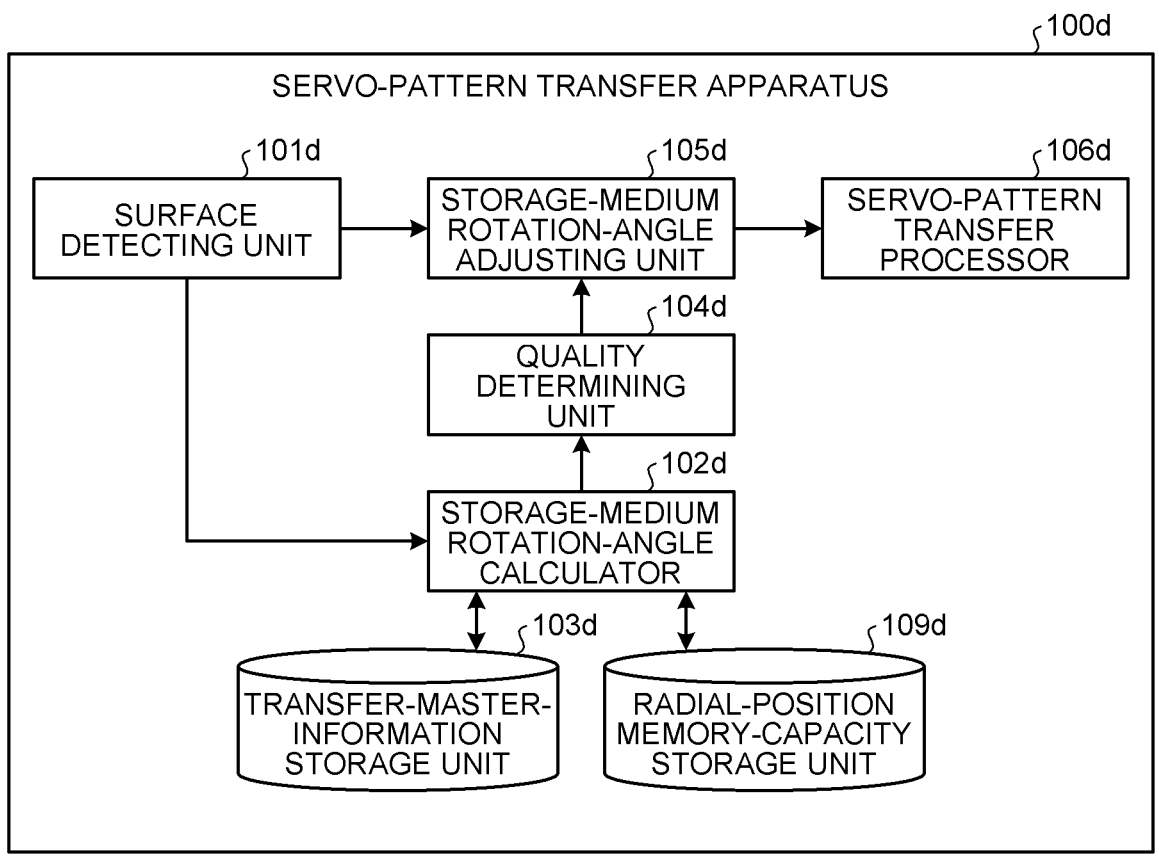
FIG. 17 is a functional block diagram of a configuration of a servo-pattern transfer apparatus according to a fourth embodiment of the present invention.
FIG. 18 is one example of a radial-position memory-capacity storage table according to the fourth embodiment.
Figure 19:
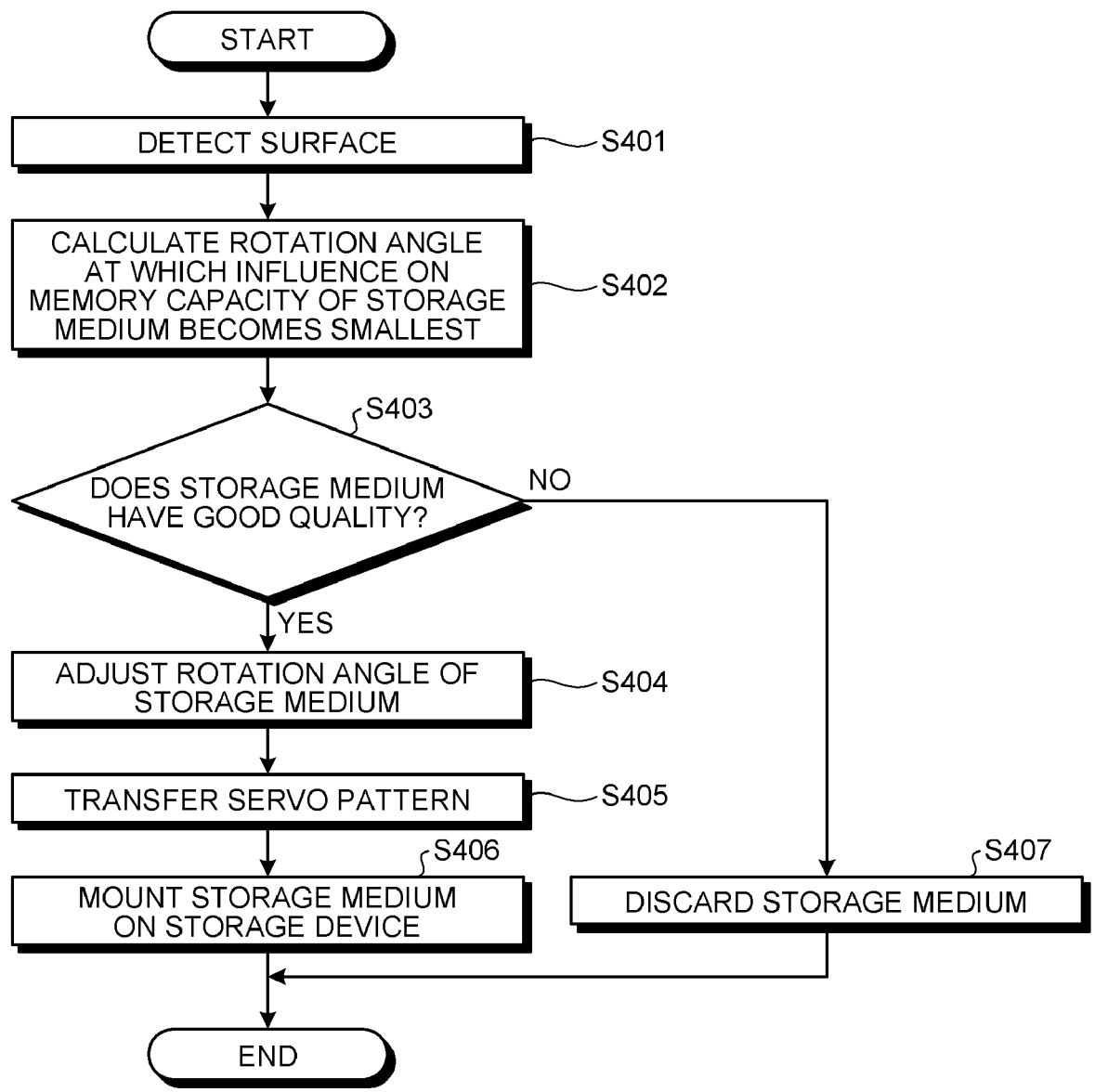
FIG. 19 is a flowchart of a servo-pattern transfer process procedure according to the fourth embodiment.

One example of the fourth embodiment is explained with reference to FIGS. 17 to 19. A configuration of the servo-pattern transfer apparatus according to the fourth embodiment is explained first. FIG. 17 is a functional block diagram of the configuration of the servo-pattern transfer apparatus. In the explanations of the fourth embodiment, only different features from those of the first embodiment are explained.

As shown in FIG. 17, a servo-pattern transfer apparatus 100d according to the fourth embodiment includes a surface detecting unit 101d, a storage-medium rotation-angle calculator 102d, a transfer-master-information storage unit 103d, a quality determining unit 104d, a storage-medium rotation-angle adjusting unit 105d, a servo-pattern transfer processor 106d, and a radial-position memory-capacity storage unit 109d.

The surface detecting unit 101d, the transfer-master-information storage unit 103d, the quality determining unit 104d, the storage-medium rotation-angle adjusting unit 105d, and the servo-pattern transfer processor 106d have respectively the same functional configuration as that of the surface detecting unit 101a, the transfer-master-information storage unit 103a, the quality determining unit 104a, the storage-medium rotation-angle adjusting unit 105a, and the servo-pattern transfer processor 106a of the servo-pattern transfer apparatus 100a. Therefore, explanations thereof will be omitted.

The radial-position memory-capacity storage unit 109d stores a radial-position memory-capacity storing table, for example, as shown in FIG. 18. The radial-position memory-capacity storing table includes information of a radial position on the storage medium and a memory capacity of the corresponding track or sector. In FIG. 18, if R1<R2<R3, a magnitude correlation of C1<C2<C3 is established. This is because the memory capacity to be position-controlled according to one servo pattern by the head increases as it is closer to the periphery of the storage medium.

The storage-medium rotation-angle calculator 102d calculates, for example, the adjusted value "$\theta_{adj}$" of the relative angle based on the following equation, instead of the equation (2). That is, according to the following equation, an influence with respect to an entire memory capacity of the storage medium can be made minimum by weighting the superposition on the foreign substance or defect on the surface of the storage medium according to an internal circumference or an external circumference, such that a stricter condition is imposed as it is closer to the periphery of the storage medium.

$$Adj = \min_{\theta}\left[\sum_i \{Ci \times \delta_i(\theta)\}\right] \quad (3)$$

where $C_i$ is a memory capacity that cannot be used due to a foreign substance or defect i on the storage medium.

The storage-medium rotation-angle adjusting unit 105d rotates and adjusts the storage medium according to the adjusted value "$\theta_{adj}$" of the relative angle calculated based on the equation (3) mentioned above.

The servo-pattern transfer process according to the fourth embodiment is explained next. FIG. 19 is a flowchart of the servo-pattern transfer process procedure according to the fourth embodiment. Because steps S401 and S403 to S407 in FIG. 19 are the same as steps S101 and S103 to S107 shown in FIG. 8, explanations thereof will be omitted.

At Step S402, the storage-medium rotation-angle calculator 102d calculates the rotation angle of the storage medium required for avoiding superposition between the foreign substance or defect on the surface of the storage medium and the transfer pattern of the transfer master, for example, based on the equation (3).

While exemplary embodiments of the present invention have been explained above, the present invention is not limited thereto, and variously modified embodiments other than the explained ones can be carried out without departing from the scope of the technical spirit described in the appended claims. Further, the effects of the present invention are not limited to the ones described above.

Among the respective processes described in the embodiments, all or a part of the processes explained as being performed automatically can be performed manually, or all or a part of the processes explained as being performed manually can be performed automatically by a known method. In addition, the process procedures, control procedures, specific names, and information including various kinds of data and parameters described in the above embodiments can be arbitrarily changed unless otherwise specified.

The respective constituent elements of the respective devices shown in the drawings are functionally conceptual, and physically the same configuration is not always necessary. That is, the specific mode of dispersion and integration of the devices are not limited to the shown ones, and all or a part thereof can be functionally or physically dispersed or integrated in an arbitrary unit, according to various kinds of load and the status of use.

All or an arbitrary part of processing functions performed by the respective devices can be realized by a central processing unit (CPU) (or a micro computer such as micro processing unit (MPU) or micro controller unit (MCU)) or a program analyzed and executed by the CPU, or can be realized as hardware by a wired logic.

According to the embodiments of the pattern transfer apparatus and the pattern transfer method disclosed above, defective transfer of a specified pattern can be avoided. Further, a high-quality specified pattern can be transferred, and the manufacturing cost of the storage medium can be reduced.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A pattern transfer apparatus comprising:
   a storage-medium-surface detecting unit that detects a foreign substance or defect on a surface of a storage medium and specifies a position and a size of the foreign substance or defect;
   a relative-position adjusting unit that adjusts a relative position on a contact surface between the surface of the storage medium and a transfer pattern surface of a transfer master, which comes in contact with the surface of the storage medium, the transfer pattern surface magnetically or physically transferring a specified pattern thereto; and
   a relative-position-adjustment instructing unit that calculates an adjusted value of the relative position according to a detection result by the storage-medium-surface detecting unit, and instructs the relative-position adjusting unit to adjust the relative position based on the adjusted value.

2. The pattern transfer apparatus according to claim 1, wherein the specified pattern is a magnetic pattern or a physically formed irregular pattern.

3. The pattern transfer apparatus according to claim 1, wherein when the surface of the storage medium and the transfer pattern surface of the transfer master are brought into contact with each other, with centers thereof being aligned, the relative position is a relative angle formed by a position of a foreign substance or defect on the surface of the storage medium, the aligned center, and a position of the specified pattern held on the transfer pattern surface of the transfer master.

4. The pattern transfer apparatus according to claim 1, wherein the relative-position-adjustment instructing unit calculates the adjusted value of the relative position so that a sum total of respective superposed amounts between each foreign substance or defect on the surface of the storage medium and the transfer pattern surface of the transfer master becomes smallest.

5. The pattern transfer apparatus according to claim 4, wherein the superposed amount is a product of a radial position of the foreign substance or defect on the surface of the storage medium from the center of the storage medium and a radial length of the foreign substance or defect from the center of the storage medium.

6. The pattern transfer apparatus according to claim 4, further comprising a weighting-coefficient storage unit that stores a weighting coefficient for weighting according to a circumferential radial position of the storage medium, wherein
   the relative-position-adjustment instructing unit calculates the adjusted value of the relative position so that the sum total obtained by multiplying the respective superposed amounts by the weighting coefficient corresponding to the circumferential radial position becomes smallest.

7. The pattern transfer apparatus according to claim 1, further comprising:
   a transfer-master-surface detecting unit that detects a foreign substance and defect on the surface of the transfer master and specifies a position and a size of the foreign substance or defect;
   a transfer-master defect-information storage unit that stores defect information relating to the position and the size of the foreign substance or defect on the surface of the transfer master, detected and specified by the transfer-master-surface detecting unit;
   a superposition determining unit that determines whether each foreign substance or defect on the surface of the storage medium overlaps on the foreign substance or defect on the surface of the transfer master, wherein
   the relative-position-adjustment instructing unit calculates the adjusted value of the relative position so that the sum total of the respective superposed amounts of the respective foreign substances or defects on the surface of the storage medium and the transfer pattern surface of the transfer master becomes smallest, excluding the superposed portion between the foreign substance or defect on the surface of the storage medium and the foreign substance or defect on the surface of the transfer master.

8. The pattern transfer apparatus according to claim 1, wherein the transfer master simultaneously transfers the specified pattern onto both surfaces of the storage medium, respectively.

9. The pattern transfer apparatus according to claim 1, wherein the relative-position adjusting unit adjusts a position or a rotation angle of the storage medium, thereby adjusting a relative position on a contact surface of the surface of the storage medium and the transfer pattern surface of the transfer master.

10. The pattern transfer apparatus according to claim 1, wherein the relative-position adjusting unit adjusts the position or the rotation angle of the transfer master, thereby adjusting the relative position on the contact surface of the surface of the storage medium and the transfer pattern surface of the transfer master.

11. A pattern transfer apparatus comprising:
- a relative-position adjusting unit that adjusts a relative position on a contact surface between a surface of a storage medium and a transfer pattern surface of a transfer master, which comes in contact with the surface of the storage medium, the transfer pattern surface magnetically or physically transferring a specified pattern thereto; and
- a relative-position-adjustment instructing unit that calculates an adjusted value of the relative position according to a position and a size of a foreign substance or defect on the surface of the storage medium and instructs the relative-position adjusting unit to adjust the relative position based on the adjusted value.

12. The pattern transfer apparatus according to claim 11, wherein the relative-position-adjustment instructing unit calculates the adjusted value of the relative position so that a sum total of respective superposed amounts between the respective foreign substances or defects on the surface of the storage medium and the transfer pattern surface of the transfer master becomes smallest.

13. A method of transferring a pattern comprising:
- detecting a foreign substance or defect on a surface of a storage medium and specifying a position and a size of the foreign substance or defect;
- adjusting a relative position on a contact surface between the surface of the storage medium and a transfer pattern surface of a transfer master, which comes in contact with the surface of the storage medium, the transfer pattern surface magnetically or physically transferring a specified pattern thereto; and
- calculating an adjusted value of the relative position according to a detection result at the detecting, and instructing to adjust the relative position based on the adjusted value.

14. The pattern transfer method according to claim 13, wherein the specified pattern is a magnetic pattern or a physically formed irregular pattern.

15. The pattern transfer method according to claim 13, wherein when the surface of the storage medium and the transfer pattern surface of the transfer master are brought into contact with each other, with centers thereof being aligned, the relative position is a relative angle formed by a position of the foreign substance or defect on the surface of the storage medium, the aligned center, and a position of the specified pattern held on the transfer pattern surface of the transfer master.

16. The pattern transfer method according to claim 13, wherein the instructing calculates the adjusted value of the relative position so that a sum total of respective superposed amounts between each foreign substance or defect on the surface of the storage medium and the transfer pattern surface of the transfer master becomes smallest.

* * * * *